United States Patent
Bae

(10) Patent No.: US 7,747,263 B2
(45) Date of Patent: Jun. 29, 2010

(54) METHOD OF TRANSMITTING AND RECEIVING BROADCASTING INFORMATION BY UTILIZING A CELL BROADCASTING SERVICE IN A MOBILE TELECOMMUNICATION SYSTEM

(75) Inventor: Jong-Cheol Bae, Daegu-Kwangyokehi (KR)

(73) Assignee: Samsung Electronics Co., Ltd. (KR)

( * ) Notice: Subject to any disclaimer, the term of this patent is extended or adjusted under 35 U.S.C. 154(b) by 752 days.

(21) Appl. No.: 09/873,702

(22) Filed: Jun. 4, 2001

(65) Prior Publication Data

US 2002/0123361 A1    Sep. 5, 2002

(30) Foreign Application Priority Data

Dec. 29, 2000   (KR) ............................... 2000 86178

(51) Int. Cl.
*H04W 4/00* (2009.01)
(52) U.S. Cl. .................... 455/466; 455/3.01; 455/414.3
(58) Field of Classification Search ................ 455/426, 455/517, 414.3, 414.4, 466, 3.01–3.05, 414.1, 455/503; 340/7.51, 7.53
See application file for complete search history.

(56) References Cited

U.S. PATENT DOCUMENTS

| | | | | |
|---|---|---|---|---|
| 5,481,254 A | * | 1/1996 | Gaskill et al. | 340/825.52 |
| 5,604,921 A | * | 2/1997 | Alanara | 455/45 |
| 6,097,949 A | * | 8/2000 | Jung et al. | 455/466 |
| 6,370,391 B1 | * | 4/2002 | Lietsalmi et al. | 455/466 |
| 6,493,559 B1 | * | 12/2002 | Pecen et al. | 455/466 |
| 6,947,396 B1 | * | 9/2005 | Salmi | 370/310 |

FOREIGN PATENT DOCUMENTS

KR    100201419    3/1999

\* cited by examiner

*Primary Examiner*—Raymond S Dean
(74) *Attorney, Agent, or Firm*—The Farrell Law Firm, LLP

(57) ABSTRACT

There is provided a method of transmitting and receiving broadcasting information by utilizing a cell broadcasting service (CBS) in a mobile telecommunication system. To transmit the broadcasting information, the broadcasting information is converted to a predetermined message code to the type and contents of the broadcasting information. A message having a header indicating the type of the broadcasting information and the converted message code is generated in a format predetermined depending on the type of the broadcasting information, and transmitted by utilization of the CBS.

8 Claims, 4 Drawing Sheets

METHOD OF TRANSMITTING AND RECEIVING BROADCASTING INFORMATION BY UTILIZING A CELL BROADCASTING SERVICE IN A MOBILE TELECOMMUNICATION SYSTEM

PRIORITY

This application claims priority to an application entitled "Method of Transmitting and Receiving Broadcasting Information by Cell Broadcasting Service in a Mobile Telecommunication System" filed in the Korean Industrial Property Office on Dec. 29, 2000 and assigned Ser. No. 2000-86178, the contents of which are hereby incorporated by reference.

BACKGROUND OF THE INVENTION

1. Field of the Invention

The present invention relates generally to a short message service (SMS) in a mobile telecommunication system, and in particular, to a cell broadcasting service (CBS), which utilizes a short message service.

2. Description of the Related Art

Mobile telecommunication service providers provide an SMS to subscribers for transmission of short messages. A CBS as well as a point-to-point text service, that is, a bidirectional text service for exchanging short messages between terminals, can be provided by the SMS. CBS provides information related to daily life to terminals, in predetermined areas or in predetermined groups, such daily life information includes discounts for consumer products, stock quotes, weather, sports, currency rates and traffic status.

However, since a CBS message transmits a limited amount of broadcasting information, it is relatively impossible to provide a large amount of information or diverse pieces of information to mobile subscribers.

SUMMARY OF THE INVENTION

It is, therefore, an object of the present invention to provide a method of transmitting and receiving a large amount of broadcasting information by utilizing a CBS.

The above and other objects are achieved by providing a method of transmitting and receiving broadcasting information by utilizing a cell broadcasting service (CBS) in a mobile telecommunication system. To transmit the broadcasting information, the broadcasting information is converted to a predetermined message code according to the type and contents of the broadcasting information. A message having a header indicating the type of the broadcasting information and the predetermined message code is generated in a format predetermined depending on the type of the broadcasting information, and transmitted by utilizing the CBS.

Upon receipt of the CBS message, a mobile station checks the header of the CBS message, and recovers the broadcasting information by comparing a message code of the CBS message with a predetermined code corresponding to the type and contents indicated by the header of the CBS message, if the header indicates there is a coded message in the CBS message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
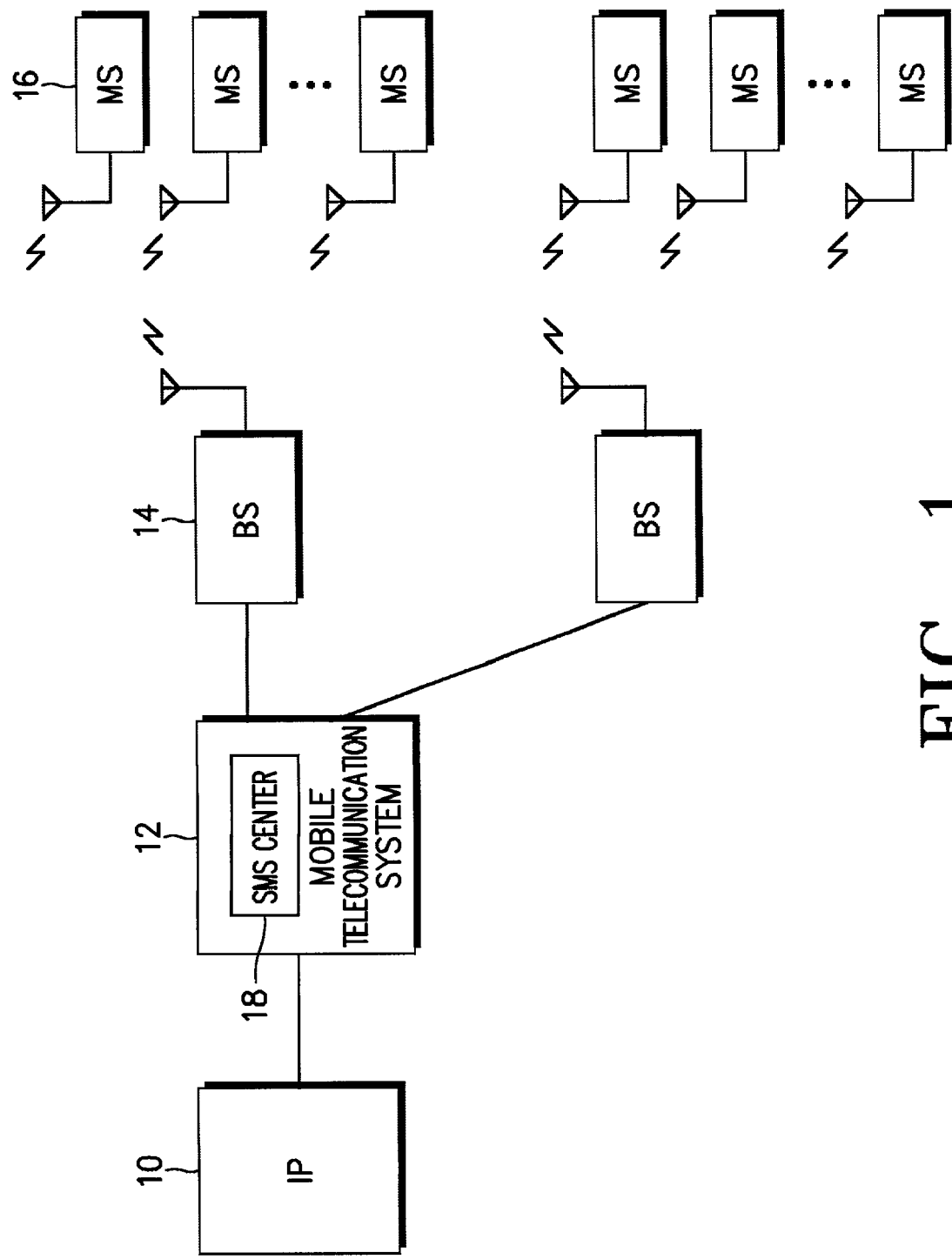
FIG. 1 illustrates the configuration of a system to which the present invention is applied.

FIG. 1 illustrates a system configuration to which the present invention is applied. The system is comprised of: an Information Provider (IP) 10, a telecommunication system 12, base stations 14 and mobile stations 16. In FIG. 1, each of the base stations (BSs) 14 is connected to mobile telecommunication system 12. Mobile telecommunication system 12 includes an SMS center 18 for processing SMS messages, which provides mobile communication to a plurality of mobile stations (MSs) 16. IP (Information Provider) 10 is connected to the mobile telecommunication system 12 in order to provide broadcasting information by utilizing the CBS. The mobile telecommunication system 12 includes a mobile telecommunication network as well as an MSC (Mobile Switching Center), an HLR (Home Location Register), a VLR (Visitor Location Register), a BSC (Base Station Controller), which is well known to those of ordinary skill in the art. Therefore, a detailed description of the mobile telecommunication system 12 will be omitted herein. Those of ordinary skill in the art recognize that a mobile telecommunication may comprise more elements than those recited above.

The IP 10 transmits various pieces of information related to daily life to the mobile stations 16 via the base stations 14 by utilizing a CBS message processed in the SMS center 18.

Figure 2:
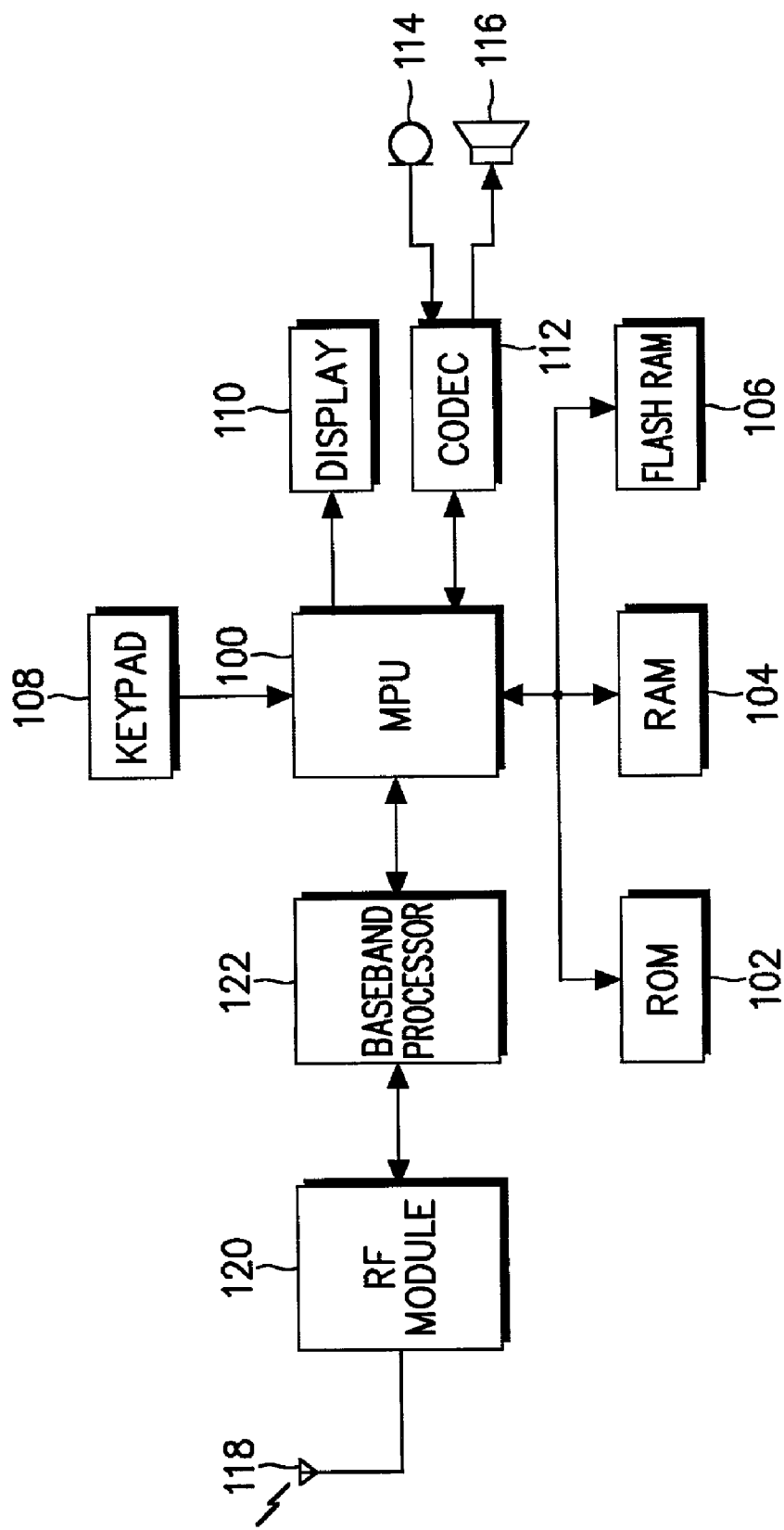
FIG. 2 is a block diagram of a mobile terminal to which the present invention is applied.

FIG. 2 is a block diagram of a typical mobile station 16 to which the present invention is applied. The mobile station 16 is comprised of: a Micro-Processor Unit (MPU) 100, a Read Only Memory (ROM) 102, a Random Access Memory (RAM) 104, a flash RAM 106, a keypad 108, a display 110, a Coder/Decoder (CODEC) 112, a microphone 114, a speaker 116, an antenna 118, a Radio Frequency (RF) module 120 and a baseband processor 122. Referring to FIG. 2, MPU 100 processes and controls the CBS, according to the present invention, as well as telephone calls, data communication, and Internet access. ROM 102 stores the micro-codes of control programs for the MPU 100 and reference data. RAM 104 acts as a working memory for the MPU 100. Flash RAM 106 stores updatable data, in order to keep the updatable data stored in the MPU 100. The flash RAM 106 is also partially used for storing CBS messages. Keypad 108 includes a plurality of digit keys and function keys and provides data corresponding to keys pressed by a user to the MPU 100. CODEC 112 is connected to the MPU 100. Microphone 114 and speaker 116 are voice input/output blocks for telephone calls and voice recording. RF (Radio Frequency) module 120 transmits/receives radio signals to/from a base station 14, shown in FIG. 1. The RF module 120 modulates a transmission signal received from the MPU 100 through a baseband processor 122 and transmits the modulated signal through an antenna 118. The RF module 120 demodulates an RF signal received through the antenna 118 and transmits the demodulated signal to the MPU 100. The baseband processor 122 processes baseband signals transmitted between the RF module 120 and the MPU 100.

In order to increase the amount of information broadcasted to the mobile station by the conventional CBS in the mobile telecommunication system 12, a transmitter converts broadcasting information to a predetermined message code according to its type and contents prior to transmission, and a receiver recovers the received message code to the original broadcasting information. Consequently, more information can be transmitted than in a conventional CBS message.

For this purpose, the mobile telecommunication system 12 and the mobile station 16 store tables listing predetermined codes versus the types and contents of broadcasting information in a database. An example code table for weather information is shown below.

TABLE 1

| Information type | | Contents | | | | | | |
|---|---|---|---|---|---|---|---|---|
| | | area | | date | | time | | weather |
| code | contents | code | contents | code | contents | code | contents | code | contents |
| 00 | weather | 00 | New York | 00 | today | 00 | 06 | 00 | fine |
| | | 01 | Chicago | 01 | tomorrow | 01 | 07 | 01 | cloudy |
| | | 02 | Seattle | 02 | day after tomorrow | 02 | 08 | 02 | snow |
| | | 03 | Denver | 03 | two days after tomorrow | 03 | 09 | 03 | rain |
| . | . | . | . | . | . | . | . |
| . | . | . | . | . | . | . | . |
| . | . | . | . | . | . | . | . |

Figure 3:
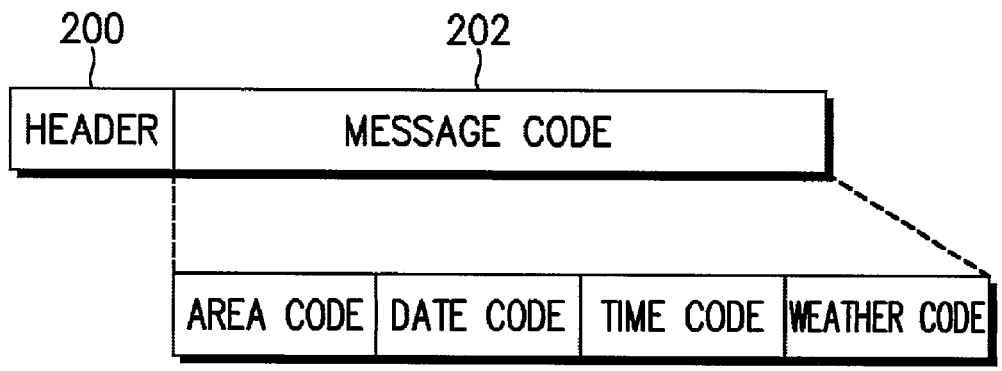
FIG. 3 illustrates the format of a message, according to an embodiment of the present invention.
Figure 4:
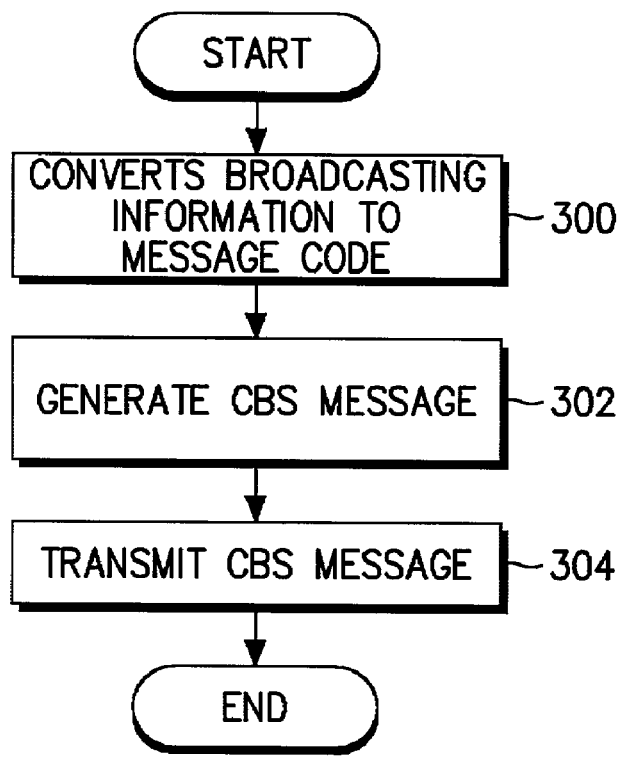
FIG. 4 is a flowchart, which illustrates a message transmission procedure according to the embodiment of the present invention.

Now, the procedure for broadcasting information transmission by utilizing the CBS in the mobile telecommunication system 12, as shown in FIG. 1, referring to FIGS. 3 and 4, shall be discussed.

Referring to FIG. 4, in step 300 broadcasting information is converted to predetermined message codes, according to types and contents. A message with a header indicating the type of broadcasting information, and a converted message code is generated in a predetermined format, according to the type of the broadcasting information in step 302. The message format is shown in FIG. 3 by way of example. FIG. 3 shows weather information converted to a message code based on the code table shown in Table 1. The message is comprised of a header 200 and a message code 202. According to Table 1, the header 200 is 00 and the message code includes an area code, a date code, a time code and a weather code. The SMS center 18 transmits the generated message to the mobile station 16 by utilizing the CBS in step 304.

A CBS message reception procedure in the mobile station will be described with reference to FIG. 5.

Figure 5:
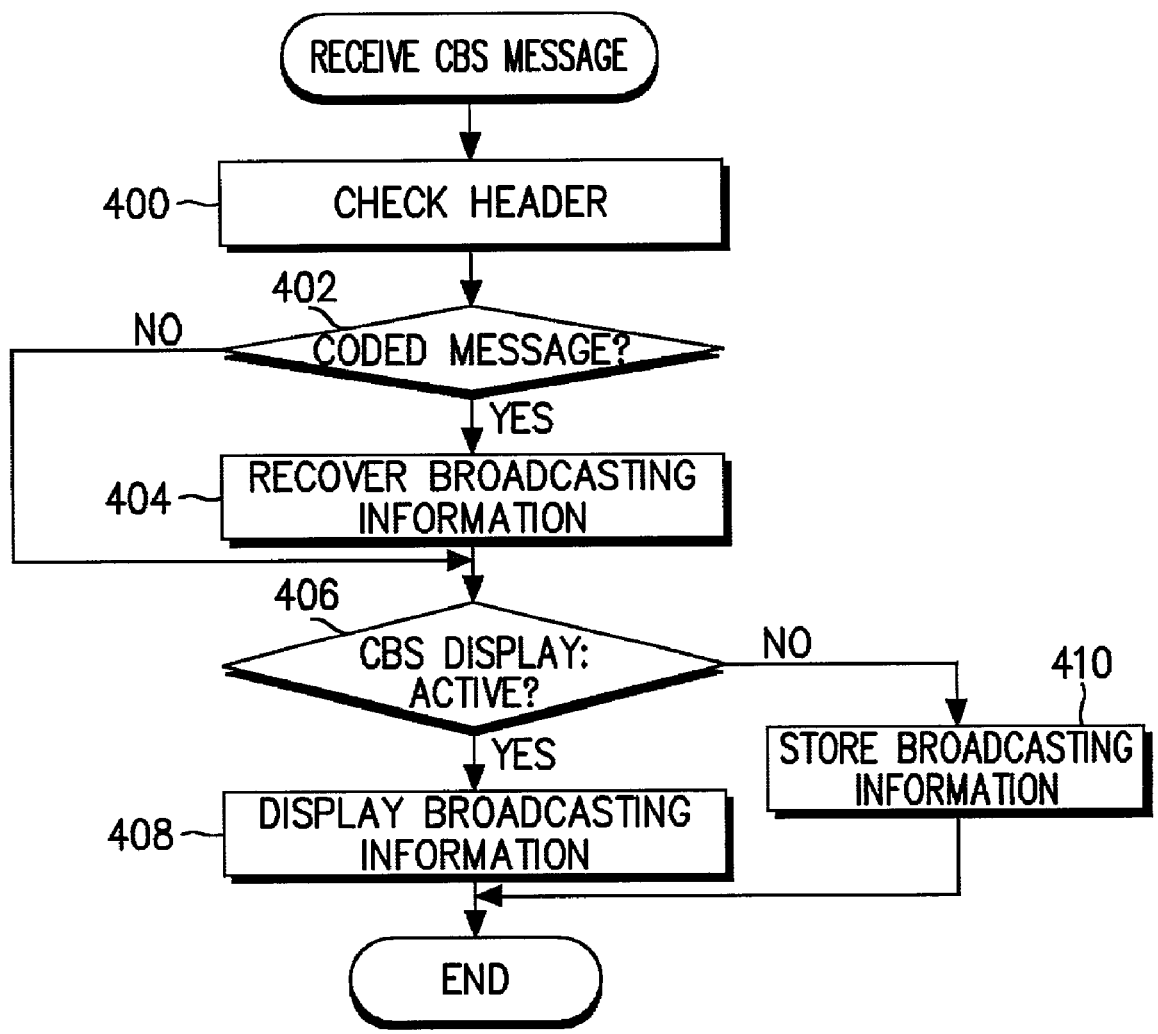
FIG. 5 is a flowchart, which illustrates a message reception procedure according to the embodiment of the present invention.

Referring to FIG. 5, upon receipt of the CBS message, the MPU 100 checks the header of the CBS message, in step 400. If the header indicates a coded message, that is, a message converted to a message code, the MPU 100 goes to step 404. For example, if the header is 00 according to the code table shown in Table 1, then there is a coded message. In step 404, the MPU 100 compares the message code of the received CBS message with a predetermined code in Table 1, according to the type and contents of the broadcasting information indicated by the header, then the MPU 100 recovers the broadcasting information, and goes to step 406. A database such as Table 1 is stored in the flash RAM 106 of the mobile station 16.

On the other hand, if the header does not indicate there is a coded message, that is, if the header indicates that the CBS message received is a typical CBS message, this implies that the broadcasting information was not coded and there is no need to recover the broadcasting information based on the code table. Therefore, the MPU 100 jumps to step 406 from step 402.

In step 406, the MPU 100 checks whether a CBS display state is active or not. If it is active, the MPU 100 displays the CBS message on a display 110, in step 408. If it is not active, the MPU 100 stores the CBS message in the flash RAM 106, in step 410, so that it can be displayed upon user request. Steps 406 to 410 are also performed in the same manner as a conventional CBS message reception procedure.

As described above, the amount of transmission data is decreased by encoding broadcasting information, according to its type and contents, prior to transmission, according to the present invention. Consequently, more information can be transmitted by a conventional CBS message. That is, a CBS message is transmitted after encoding by the conventional CBS, according to the present invention.

While the invention has been shown and described with reference to a certain preferred embodiment thereof, it is a mere exemplary application. Besides weather information described as broadcasting information to be transmitted by the CBS in the above embodiment, other kinds of information can be broadcasted by the CBS. Therefore, it will be understood by those skilled in the art that various changes in form and details may be made therein without departing from the spirit and scope of the invention as defined by the appended claims.

What is claimed is:

1. A method of transmitting broadcasting information to a mobile station by utilizing a cell broadcasting service (CBS), comprising:

convening broadcasting information to a predetermined message code that includes code for both type and contents of the broadcasting information based on codes previously assigned to generic types and contents of broadcasting information and stored in a code table;

generating a message having the converted predetermined message code and a header indicating the type of the broadcasting information in a format predetermined depending on the type of the broadcasting information; and transmitting the generated message by utilizing the CBS, wherein the converted predetermined message code includes a code that is predetermined for at least one word for indicating the contents of the broadcasting information.

2. The method of claim 1, wherein if the broadcasting information is weather information, the predetermined message code includes an area code, a date code, a time code, and a weather code.

3. A method of receiving broadcasting information in a mobile station by utilizing a cell broadcasting service (CBS), comprising:

checking a header of a CBS message upon receipt of the CBS message; and if the header indicates there is a coded message, recovering broadcasting information by comparing a message code of the CBS message with a predetermined code previously assigned to generic types and contents of broadcasting information and stored in a code table that includes code for both type and contents indicated by the header of the CBS message.

4. The method of claim 3, wherein if the broadcasting information is weather information, the message code includes an area code, a date code, a time code, and a weather code.

5. A method of transmitting and receiving broadcasting information by a cell broadcasting service (CBS) in a mobile telecommunication system, comprising:

converting broadcasting information to a predetermined message code that includes code for both type and contents of the broadcasting information based on codes previously assigned to generic types and contents of broadcasting information and stored in a transmitter code table;

generating a message having a header indicating the type of the broadcasting information and the predetermined message code in a format predetermined depending on the type of the broadcasting information;

transmitting the generated message by utilizing the CBS;

receiving the CBS message;

checking the header of the CBS message upon receipt of the CBS message in a mobile station; and if the header indicates there is a coded message, recovering the broadcasting information by comparing a message code of the CBS message with a predetermined code previously assigned to the generic types and contents of broadcasting information and stored in a receiver code table corresponding to the type and contents indicated by the header of the CBS message.

6. The method of claim 5, wherein if the broadcasting information is weather information, the message code includes an area code, a date code, a time code, and a weather code.

7. The method of claim 6, further comprising determining if a display state is active, and displaying the CBS message if the display state is active.

8. The method of claim 6, further comprising determining if a display state is active, and storing the CBS message in memory if the display state is not active.

* * * * *